March 11, 1947.  A. A. JOHNSON  2,417,166
TOWING WINCH
Filed Aug. 13, 1945  5 Sheets-Sheet 1

INVENTOR.
Almon A. Johnson.
BY Walter C. Ross.
Attorney.

March 11, 1947.  A. A. JOHNSON  2,417,166
TOWING WINCH
Filed Aug. 13, 1945  5 Sheets-Sheet 2

INVENTOR.
Almond A. Johnson.
BY Walter C. Ross
Attorney.

March 11, 1947.    A. A. JOHNSON    2,417,166
TOWING WINCH
Filed Aug. 13, 1945    5 Sheets-Sheet 3
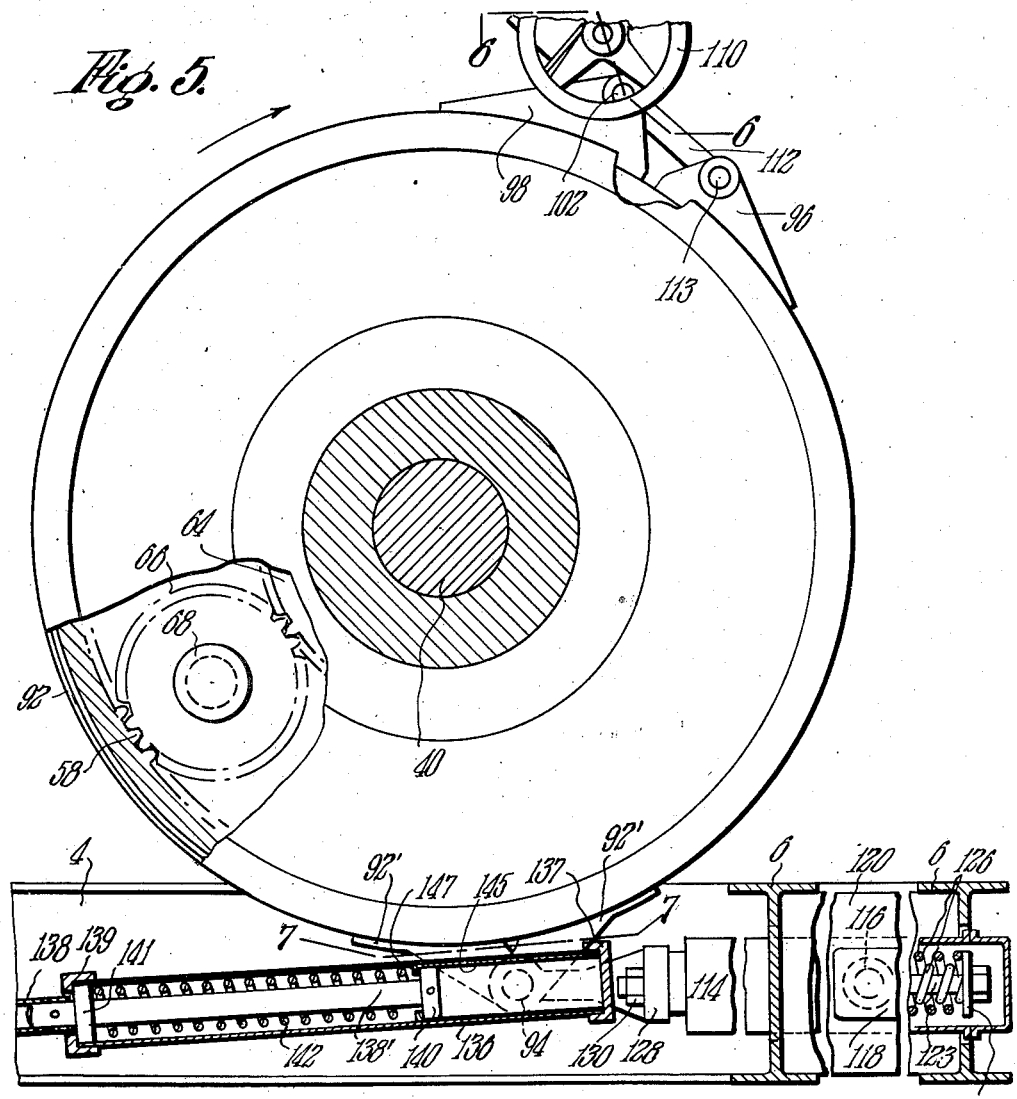
INVENTOR.
Almon A. Johnson
BY Walter C. Ross
Attorney

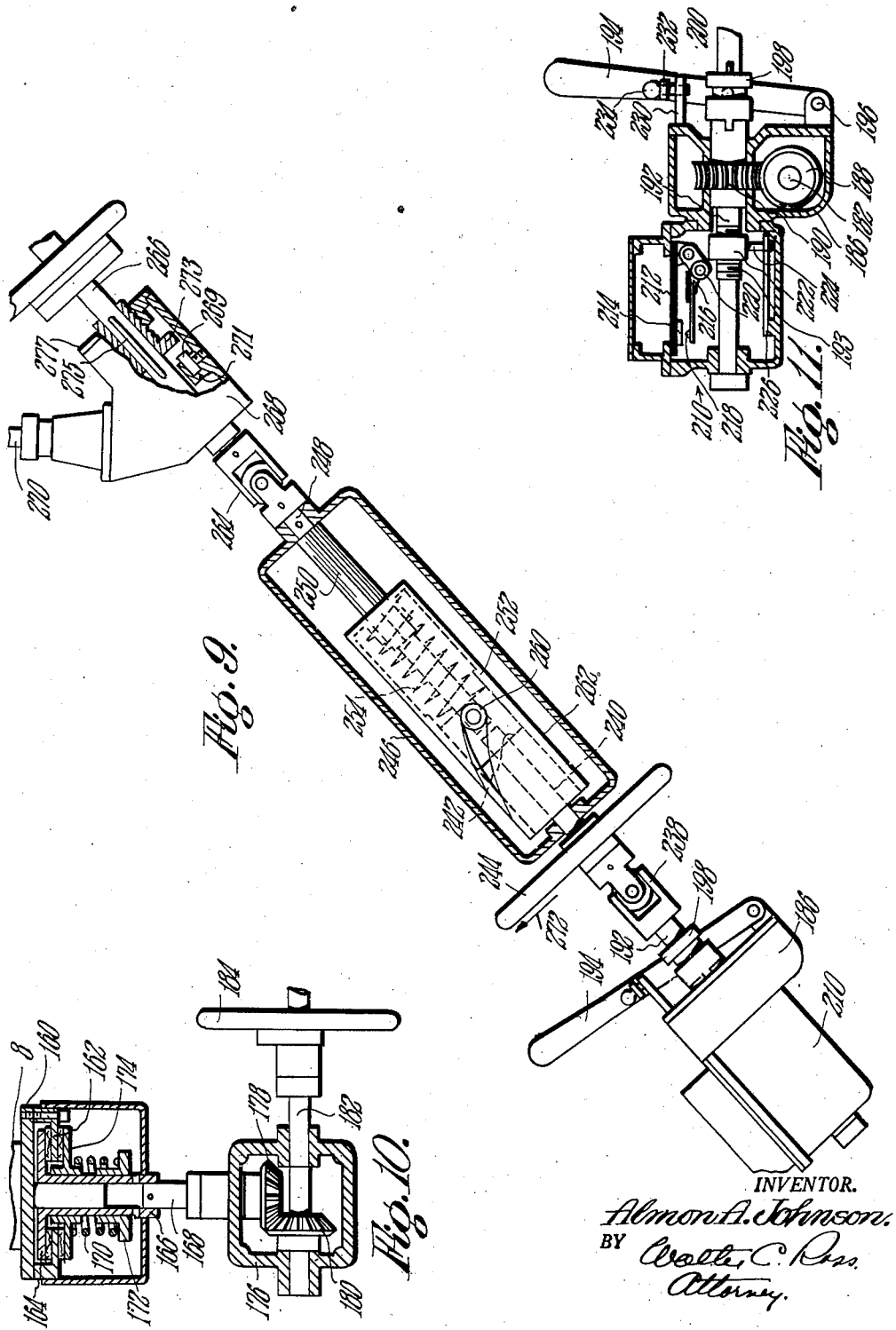

Patented Mar. 11, 1947

2,417,166

UNITED STATES PATENT OFFICE 2,417,166

TOWING WINCH

Almon A. Johnson, Forest Hills, N. Y.

Application August 13, 1945, Serial No. 610,410

10 Claims. (Cl. 254—172)

This invention relates to improvements in towing winches.

The principal objects of the invention are directed to the provision of a towing winch characterized by power means consisting of a steam engine which is operable and controlled for automatically paying out and reclaiming of a towing line accordingly as the strain on the cable varies.

Numerous objects and advantages of the invention as well as novel features of construction will be hereinafter referred to in connection with the accompanying description of the preferred form of the invention.

In the drawings:

Fig. 5 is an enlarged transverse sectional elevational view through the main shaft of the apparatus shown in Figs. 1 and 2;

Fig. 6 is a sectional plan view on the line 6—6 of Fig. 5;

Fig. 7 is a sectional plan view on the line 7—7 of Fig. 5;

Fig. 9 is a sectional elevational view on the line 9—9 of Fig. 2;

Fig. 10 is a sectional plan view on the line 10—10 of Fig. 2; and

Fig. 11 is a longitudinal view through the reclaiming switch mechanism of the apparatus.

Figure 1:
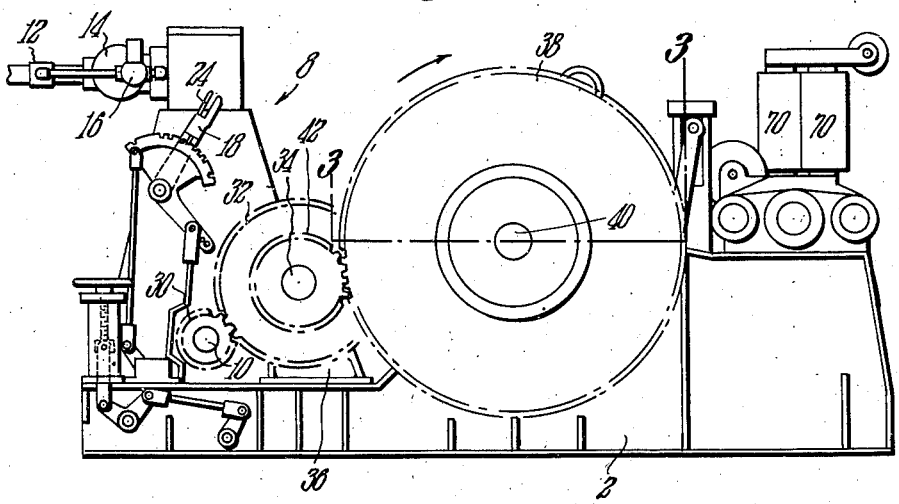
Figs. 1 and 2 are front and rear side elevational views respectively of a winch apparatus embodying the novel features of the invention.

Referring now to the drawings in detail, the invention will be more fully described.

Side frames 2 and 4 are provided at opposite sides of the apparatus which are connected by transverse members 6, such as shown in Fig. 5. The frame structure is preferably formed from welded together members to provide a strong, rigid structure but may be otherwise formed, if desired.

An engine is shown at 8 which in the form of the invention shown is of the twin vertical duplex steam type. Said engine has a driving shaft 10 which is rotatable in opposite directions for operating the winch apparatus.

Figure 4:
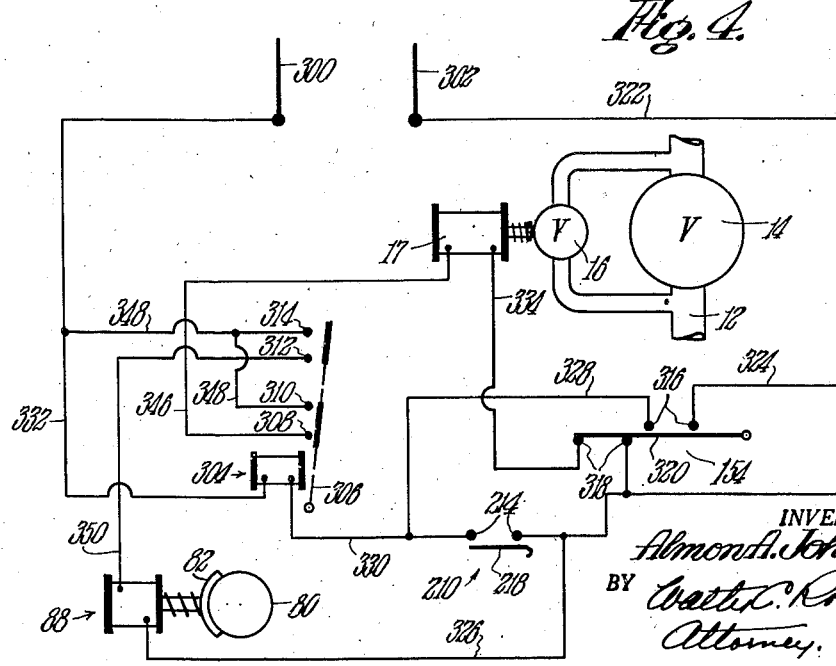
Fig. 4 is a wiring diagram to explain certain features of the invention.

The engine receives steam through a pipe 12 having a main valve 14 therein and an auxiliary valve 16 is by-passed around the main valve, as shown in Figs. 1 and 4. The engine has valve link mechanism for controlling the admission of steam and operation of the engine which may be of the usual form and a hand-lever 18 is connected to the mechanism for operation thereof.

Figure 8:
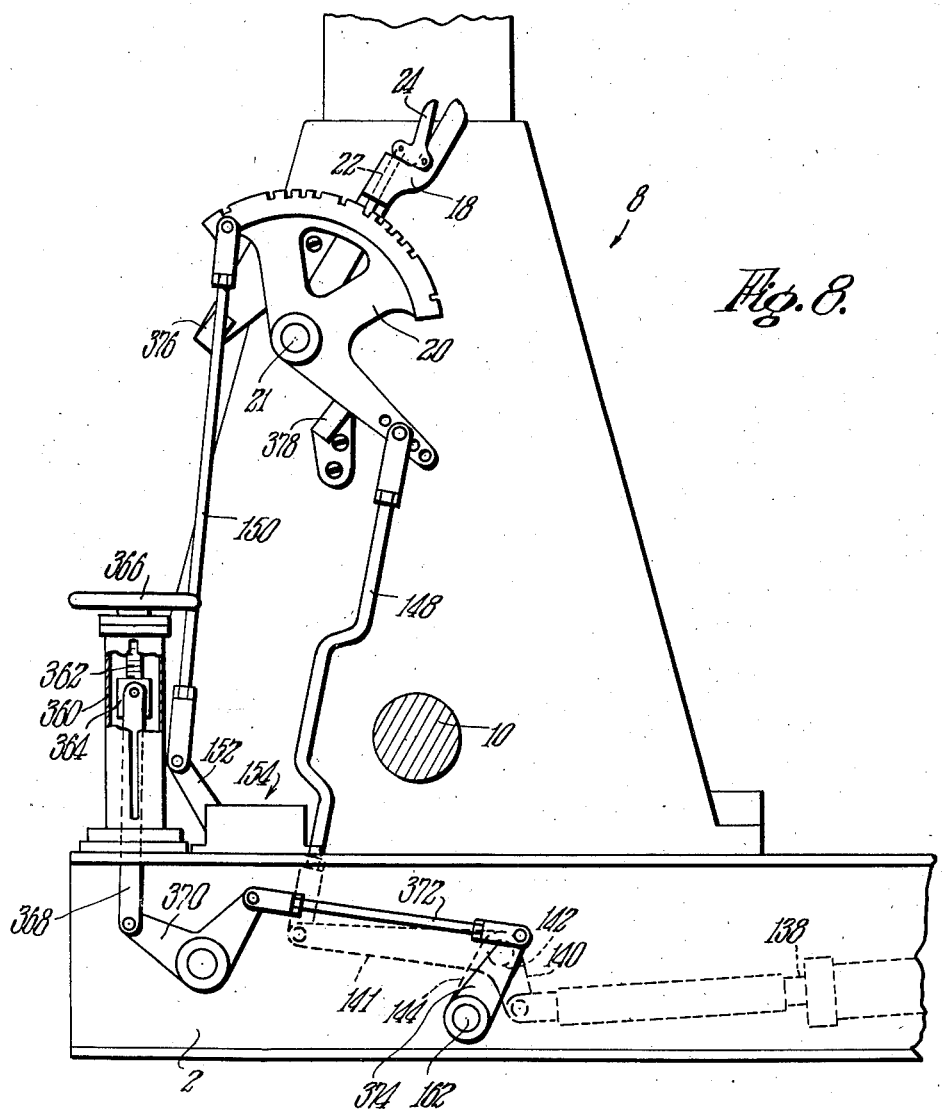
Fig. 8 is a side elevational view of the front side of the engine of the apparatus.

The hand-lever 18 in Figs. 1 and 8 is in the heaving-in position so as to adjust the link mechanism whereby the engine will operate the winch for heaving-in or reclaiming line. A substantially vertical position of said lever is the neutral position and a position to the left of the vertical or about 30 degrees to the left from the vertical is the paying-out position of the lever 18 in which position the engine operates the winch apparatus to pay out line.

A quadrant 20 is swingable on a shaft 21 to which the lever 18 is secured. A detent 22 slidable in the lever 18 is engageable with various notches provided in the quadrant, as shown, and is actuated by a member 24 pivoted to the handle and to the detent.

The quadrant is swung on its axis by the winch apparatus in automatic operation thereof, as will later appear, so as to swing the hand-lever and bring about the desired operation of the engine for operating the winch.

Figure 3:
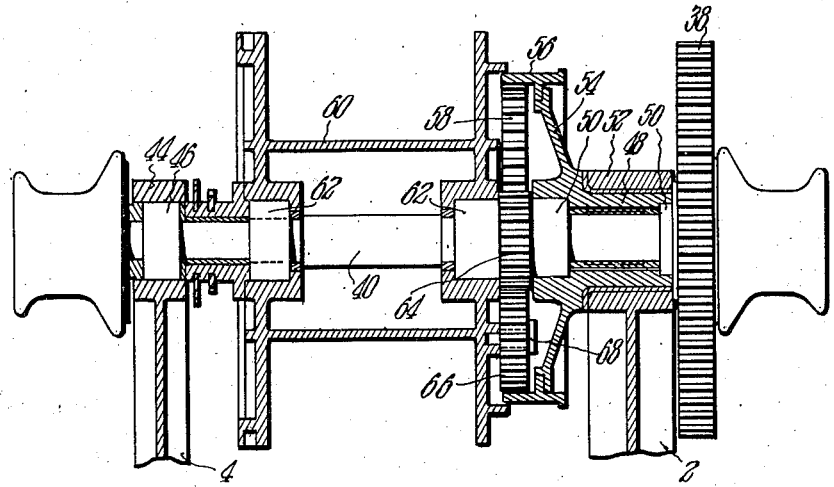
Fig. 3 is a sectional plan view on the line 3—3 of Fig. 1.

A pinion 30 is fixed to the forward outer end of the engine shaft 10 which is in mesh with a gear 32 fixed on a shaft 34 rotatable in a bearing stand 36. A gear 38 is fixed on the forward end of a main shaft 40 and is in mesh with a pinion 42 fixed to shaft 34. The rear end of said shaft 40 is journalled in a bearing 44 of side frame 4 by means of an anti-friction bearing 46. The forward end of the shaft 40 is journalled in a hub 48 by means of anti-friction bearings 50 and said hub 48 in turn is rotatable in a bearing 52 of side frame 2 all as shown in Fig. 3. A member 54 associated with the hub carries a brake drum 56 which has an internal gear 58.

It will be obvious that the shaft 40 and engine shaft 10 are operatively connected through the gearing described.

A line or cable drum 60, to which a tow line is secured, is mounted for rotation relative to the main shaft 40 and to the brake drum 56 by means of anti-friction bearings 62. A sun-gear 64 is fixed to the main shaft 40 and a plurality of planet-pinions 66 mounted on pins or shafts 68 carried by the drum 60 are in mesh with said sun-gear 64 and with the internal gear 58 to provide a planetary system.

Figure 2:
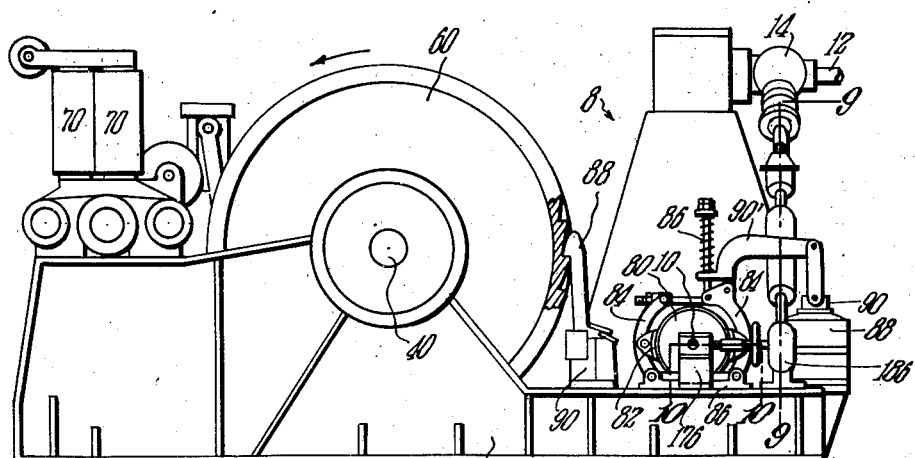

The line-drum rotates in the direction of the arrows shown in Figs. 1, 2 and 5 when line is being paid out and in a reverse direction to reclaim or heave-in the line. A line may be secured to the line drum and wound thereabout so as to extend between guide rolls 70 which form no part of the present invention.

Brake means for the engine shaft 10 will be described with reference to Fig. 2. A motor brake drum 80 is fixed to said shaft 10 and brake-shoes such as 82 for frictionally engaging the same are carried by levers 84 pivoted to a base 86. A solenoid 88 has a member 90 connected to one of said levers 84 and a spring rod construction 96 urges the levers together. The mechanism is constructed and arranged so that when the solenoid is energized the brake is not operative to hold the engine shaft against rotation while when de-energized the brake becomes operative and the engine shaft held against rotation.

The drum 60 is provided with circumferentially spaced teeth and a dog 88 pivoted to a bracket 90 for swinging movements is adapted to engage said teeth and hold the drum against rotation in paying out direction.

With the dog 88 out of engagement with the drum teeth and with the engine brake holding the engine shaft against rotation, a strain on the line will cause the line drum to rotate and through the planetary gearing described will cause the brake drum 56 to rotate.

Means, however, is provided to hold the brake-drum 56 against rotation up to a certain strain on the line but when the strain is exceeded the said means yields to permit paying out rotation of the drum while other means comes into operation to reclaim the line paid out.

Such means as in Figs. 5, 6 and 7 includes brake band members 92 having linings in frictional engagement with the brake drum 56 and parts 92' which are pivoted together on a pin 94 at their lower ends. Brackets 96 and 98 are provided at their upper ends. A yoke 100 is pivoted at 102 to the bracket 98. A housing 104 has a worm gear 106 journalled therein and said housing has an end that is curved to fit within a seat of the yoke, as shown. A transverse shaft 108 journalled in the housing 104 has a hand wheel fixed thereto and carries a worm 110 in engagement with the gear 106 therebelow. A rod 112 having a threaded end in engagement with the worm gear 106 is pivoted at 113 to the bracket 96.

As the shaft 108 is rotated in one direction or the other the gear 106 is rotated so that rod 112 is moved in one direction or the other whereby the brake-band releases or disengages the brake drum.

A spring casing 114 has trunnions 116 on opposite sides thereof which are journalled in bearings 118 fixed to plates 120 at either side of the housing. These plates 120 are fixed to the transverse members 6. Rods such as 123 in the housing have washers 124 on their inner ends and springs 126 are disposed between the washers and end of the housing. The outer ends of the rods extend through a yoke 128 and carry nuts 130 and the yoke is pivoted on the pin 94, as shown, in Fig. 7.

With the brake bands 92 frictionally engaging the brake drum 56 to hold it against rotation and with the engine shaft held against rotation by its brake, a strain on the line tending to rotate the cable drum will through the planetary gearing tend to rotate the brake-band in the direction of the arrow. The spring arrangement resists rotation of the brake band and may be such as to resist a predetermined strain or pull and to yield when the pull is exceeded.

The springs will resist movement of the brake band under predetermined ordinary conditions of towing but will yield when a surge on the line occurs and cause the apparatus to pay out or allow line to be paid out and thereafter reclaim or heave in line that is paid out.

A spring link construction, see Figs. 5 and 7, includes the following:

An outer tube 136 which has a bracket 138 fixed thereto that is journalled on the end of the pin 94. Inner and outer end caps 137 and 139 are fixed to opposite ends of said tube. A link tube 138 has fixed in the end thereof a rod 138'. The cap 139 is slidable on tube 138 and a collar 141 is slidable in tube 136 and on rod 138'. A head 140 is fixed to the inner end of rod 138' and an inner sleeve 145 is slidable in tube 136 and has a lip 147 fixed thereto. A spring 142 is disposed between collar 141 and lip 147. A pull on the line sufficient to rotate the line drum and the brake band clockwise causes the tube 136 to be moved to the left in Fig. 5 so that spring 142 is compressed between lip 147 and the collar 141 which acts on end of link tube 138. When the pull on the line is relieved so that brake band moves counterclockwise tube 136 is moved to the right causing collar 141 to compress spring 142. This construction provides a yieldable connection between the brake band and the control parts and is operable in opposite directions to prevent injury to the control parts which have relatively less movement than the brake band.

The tube 136 has its outer or left end pivoted to one end 140 of a lever 141 which is pivoted at 142 on the upper end of a lever 144, see Fig. 8. Said lever 144 is fixed to a shaft 162 oscillatable in the side frame 2. A rod 148 pivoted at its lower end to lever 141 has its upper end connected to quadrant 20. A link 150 has its upper end connected to said quadrant and its lower end connected to the actuating lever 152 of a pilot switch 154.

Mechanism for operating the valve 14 will now be described with reference to Figs. 2, 9, 10 and 11. A flange 160 is secured to the outer end of shaft 8 of the engine to which is secured a clutch plate 162. A plate and tube 164 is connected through a coupling 166 fixed to a shaft 168. A spring 170 is disposed between a flange 172 and a plate 174. The spring urges the members 164, 162 and 174 into clutching engagement so that the shaft 168 is rotated by the engine shaft 10. Any other form of clutch may be provided.

The shaft 168 is journalled in a housing 176 and a gear 178 thereon is in mesh with a gear 180 on a shaft 182 which extends from the housing and carries a hand wheel 184. The shaft 182 extends into a housing 186 and has a worm 188 thereon which is in mesh with a gear 190 loose on a shaft 192. A lever 194 pivoted to the housing at 196 is in engagement with a clutch member 198 slidable on the shaft 192 but held against relative rotation by a key 200. The clutch member is arranged for clutching engagement with gear 190 so that the gear as it is rotated by worm 188 rotates the shaft 192.

A reclaiming switch indicated generally by 210 is associated with the housing 186. An insulating member 212 carries spaced apart contacts 214. A swingable lever 216 carries a contact bar 218 for engaging and connecting the contacts 214 and has a roll 220 thereon. The end 193 of shaft 192 is provided with a screw thread and a collar 222 in threaded engagement therewith has a pin 224 which is slidable between guide bars 226. As the shaft rotates in one direction and the other, the collar 222 is moved back and forth to engage or disengage the lever roll thereby to connect contacts 214 or to disconnect them.

A lug 230 on the housing and a lug 232 on lever 194 have openings therein for a pin 234 whereby the said lever may be held in the position shown in Fig. 11.

The shaft 192 is connected by a universal joint 238 to a shaft 240. Said shaft 240 is fixed in a block 242 and has a hand wheel 244 fixed thereto. A casing 246 is rotatable on the shaft 240 and a shaft 248 has a squared part 250 on which is slidable the upper part of a tube 252.

Said tube 252 is slidable on the block 242 and on square shaft 250 and a spring 254 is disposed between the block 242 and upper end of the tube tending to urge the tube upwardly. Rollers such as 260 are provided on opposite sides of the block which are disposed in longitudinal spirally arranged slots 262 in opposite sides of the tube 252.

The shaft 248 is connected by a universal joint 264 to a shaft 266 which extends through a housing 268. Said shaft 266 is connected to the operating stem of valve 14. The housing 268 may contain gearing for operatively connecting the shaft 266 to a shaft 270. A hand wheel is fixed on shaft 266.

A stop 269 is adjustable in a lug 271 of the housing 268. A stop 273 is slidable on shaft 266 and is held against rotation by a key 275. The stop 273 is externally threaded and in engagement with a cap 277 secured to the housing. As the shaft 266 rotates in one direction or the other the stop 273 is moved towards and away from stop 269. When the stops are engaged they hold the shaft 266 against further rotation.

The shaft 192 is rotated in the direction of arrow 272 for opening the valve 14 and in a reverse direction for closing said valve. The parts in Fig. 9 are shown in the closed position of the main valve and as the shaft 192 is rotated to open the valve the rotation of block 242 through rollers 260 and slots 262 causes the tube 252 to move upwardly until the rollers are in the bottoms of the slots when the shaft 250 and thereby the valve stem will be rotated to open the valve. The spring urges the tube upwardly.

When shaft 192 is rotated in an opposite direction to close valve 14, the spring holds tube 252 in upper position until the valve is fully closed when it is moved downwardly and during this rotation of shaft 192 contacts 214 are opened by movement of collar 222.

The connection of various components and the electrical circuits will now be described with reference to Fig. 4. A power line is represented by 300 and 302 and the main and auxiliary steam valves by 14 and 16 the latter of which has a stem associated with a solenoid 17 which when energized operates to open said auxiliary valve.

A relay is represented by 304 which has a swingable arm 306 for making contacts 308 and 310, and contacts 312 and 314. The pilot switch 154 has pairs of contacts 316 and 318, and a swingable arm 320 engageable with either pair of contacts. The reclaiming switch 210 has contacts 214 and the movable member 218. One contact 214 and one of the contacts 318 and 316 are connected by 322, 324 and 326 with the engine shaft brake solenoid 88.

The other of the contacts 316 and 214, are connected by 328 and 330 to the relay 304 which is connected by 332 to 300. The other one of contacts 318 is connected by 334 to the solenoid 17 of the auxiliary valve. The contact 308 is connected by 346 to the solenoid 17. Contacts 310 and 314 are connected by 348 to 332. Contact 312 is connected by 350 to the solenoid 88 of brake for the engine shaft.

In the operation of the apparatus when it is mounted on a towing ship and a line around the drum 60 extending to a ship being towed the brake-drum 56 is yieldingly held against rotation by the brake-band 92.

The engine shaft brake holds the engine shaft against rotation, valves 14 and 16 are closed, contacts 214 are disconnected, contacts 318 of the pilot switch 154 are connected, and the relay contacts are disengaged.

Worm gear 190 is clutched to the shaft 192.

When a surge occurs on the line which exceeds the normal so that the line drum 60 through the planetary system moves the brake drum 56 and thereby the brake band clockwise, the tube 136 acts on the tube 138, see Fig. 5, so that lever 141 is swung clockwise. Rod 148 swings quadrant 20 counterclockwise, see Fig. 8. As quadrant 20 swings, the lever 152 of pilot switch 154 is operated so as to move arm 320 of said switch into engagement with contacts 316 and out of contact with 318. By the quadrant the lever 18 is swung to a central neutral position. The relay 304 is energized so that its arm 306 closes the circuits including the engine brake solenoid.

With the engine shaft brake now released the line drum rotates to pay out cable and through the planetary system the engine shaft is rotated in paying-out direction whereby shaft 192 is rotated in a direction to open the main valve 14.

The shaft 240 in its rotation by shaft 192 causes the tube 252 to be moved upwardly on shaft 250 and when in upper position the shaft 248 and connections to the main valve 14 are operated to commence opening of the main valve 14. Some line is paid out during this operation and if the strain on the line continues the valve 14 is operated to its wide open position. Should the strain on the line continue after the valve 14 is open so that rotation of the line drum and engine shaft continues, movement of the valve shaft is arrested and the clutch mechanism of Fig. 10 slips.

The mechanism is constructed and arranged so that during opening of the main valve a predetermined length of line is paid out. Ordinarily, a surge on the line will subside before said predetermined length of line is paid out but if the surge continues the clutch slips while additional line is paid out.

When the surge subsides so the strain on the line is overcome by the springs in the casing 114 said springs move the brake band 92 counterclockwise. This action moves the tube 136 to the right in Fig. 5 and through the spring 142 the rod 138 is moved to the right. The rod 138 acts on the lever 141 so that quadrant 20 is swung clockwise to bring the valve reversing lever 18 to its heaving-in position and move contact arm 320 of the pilot switch 154 into engagement with contacts 318 thereof and break contacts 316.

Valve 14 being open as described and the lever 18 being now in heaving-in position so as to adjust the valve gear the engine shaft is rotated in a reverse or heaving-in direction so that through the planetary system the line drum is rotated in a direction to heave-in or wind up line and the shaft 192 is rotated in a direction to close valve 14.

As arm 320 is brought into engagement with contacts 318 as described the solenoid 17 of the auxiliary valve is energized to open said valve while the relay 304 is energized through the reclaiming switch whereby the engine brake solenoid remains in circuit. In this way the auxiliary valve 16 and the engine brake are under the control of the reclaiming switch.

As the engine shaft is operated to rotate the line drum in heaving-in direction, the shaft 192 is operated in reverse direction as stated. When the said valve 14 is fully closed rotation of shafts 266 and 250 is arrested while the engine continues in operation on steam admitted by the auxiliary valve 16 which by-passes the main valve 14. After closing of the main valve the continued rotation of shaft 240 is accommodated by the tube 252 which is moved downwardly relative to member 242 and shaft 250 by rollers 260. During the rotation of shaft 192 in valve closing direction the collar 222 of reclaiming switch is moved upwardly and before the tube 252 reaches its lower position the collar releases lever 216 of said switch so that contacts 214 are disconnected and the solenoid of the auxiliary valve is de-energized.

Thus after the closing of the main valve the engine is operated through the auxiliary valve for a short interval until the disconnection of contacts 214 whereupon the relay 304, solenoid 38 of the engine brake and the solenoid 17 of the auxiliary valve are de-energized so that the engine brake is applied and the auxiliary valve is closed.

As previously stated, the spring arrangement resisting movement of the brake band may be made to resist any predetermined pull on the line. This, however, may be varied by tension control means. For this purpose a stand 360 has a rod 362 rotatable therein which is threaded with a nut 364 in engagement therewith. A hand wheel 366 on the rod facilitates rotation of the rod to raise and lower the nut.

A link 368 is pivoted at its lower end to one arm of a crank 370 which is oscillatable and has its other arm connected by a rod 372 to a lever 374 fixed to shaft 162.

As the nut 364 is moved up and down the arm 370 is swung back and forth to move through the lever 374 and arm 144 the pivotal point of lever 141. Thus the action of the rod 138 on the control mechanism is variable.

Stops 376 and 378 are fixed to the engine to limit movements of the quadrant, see Fig. 8, and the lever 18 may be operated relatively and independent of the quadrant and the mechanism for tightening the brake band on the brake drum may be released to permit free rotation of the line drum for rapidly paying out cable.

If desired the apparatus may be manually operated and may be accomplished by disengaging clutch 198, adjusting the tension adjuster, disconnecting lever 18 from the quadrant and closing the necessary circuits.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A winch of the class described comprising in combination a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and adapted when energized to open said auxiliary valve, connections between said brake band and valve gear lever adapted to move the lever in opposite directions when the brake-band moves in opposite direction, means operable by said connections to energize said electric brake mechanism whereby said engine shaft may be rotated in pay-out direction through said gearing by pay-out rotation of said line-drum, and connections between said engine shaft and main valve stem whereby the latter is rotated in valve opening direction by said engine shaft when rotated in pay-out direction.

2. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said brake-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in valve opening direction by pay-out rotation of said engine shaft and rotated in valve closing direction by heave-in rotation of said shaft.

3. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said brake-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in valve opening direction by pay-out rotation of said engine shaft and rotated in valve closing direction by heave-in rotation of said shaft, and slip clutch mechanism in the connections between the engine shaft and main valve stem whereby the former may over-travel the latter.

4. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said brake-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in valve opening direction by pay-out rotation of said engine shaft and rotated in valve closing direction by heave-in rotation of said shaft, and disengageable means in the connection between the engine shaft and main valve stem to facilitate manual operation of said main valve.

5. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said brake-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in valve opening direction by pay-out rotation of said engine shaft and rotated in valve closing direction by heave-in rotation of said shaft, slip clutch mechanism in the connections between the engine shaft and main valve stem whereby the former may over-travel the latter, and disengageable means in the connection between the engine shaft and main valve stem to facilitate manual operation of said main valve.

6. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said barke-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in valve opening direction by pay-out rotation of said engine shaft and rotated in valve closing direction by heave-in rotation of said shaft, and means operable by the conections from the engine shaft to the main valve stem whereby the solenoid of the auxiliary valve is energized to hold said auxiliary valve open after the main valve is closed.

7. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said brake-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in valve opening direction by pay-out rotation of said engine shaft and rotated in valve closing direction by heave-in rotation of said shaft, said connections between the engine shaft and main valve stem including separate shafts and connecting means therebetween adapted to permit limited relative movements thereof.

8. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said brake-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in valve opening direction by pay-out rotation of said engine shaft and rotated in valve closing direction by heave-in rotation of said shaft, said connections between the engine shaft and main valve stem including aligned separate shafts, a block fixed on one shaft, a member slidable and rotatable on said block and slidable and non-rotatable on the other shaft, spring means urging said member in one direction on said block and other shaft, and engageable means associated with said block and member arranged whereby rotation of said one shaft and block moves the member in opposite directions along said other shaft to bring about rotation of said other shaft at the ends of its movements.

9. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said brake-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in opening and closing directions accordingly as the former rotates in pay-out or heave-in directions and a reclaim switch operable by said connections, connections between said brake-band and said lever whereby the latter is moved by the former from and to heave-in positions and a pilot switch operable by said connections, and electrical circuit means for connecting said switches and said solenoid and said electric brake mechanism to a source of energy, all adapted and arranged whereby as the brake-band is moved in pay-out direction the lever is moved away from heave-in position and the brake mechanism is energized while the main valve stem is rotated in valve opening direction and when said brake-band moves in heave-in direction the brake-mechanism remains energized and the valve stem is rotated in valve closing direction and the solenoid of the auxiliary valve is energized to hold said valve open.

10. A winch of the class described comprising in combination, a steam engine having a drive shaft rotatable in pay-out and heave-in directions and provided with a valve gear lever movable between neutral, pay-out and heave-in positions, electric brake mechanism associated with said engine shaft to hold the same against rotation and adapted when energized to release said shaft, a line-drum rotatable in pay-out and heave-in directions, gearing connecting said engine shaft and drum including a planetary system and having a brake-drum associated therewith, a brake-band frictionally engaging the brake drum, resisting means for the brake-band adapted to yield as the band is moved in paying-out direction by the gearing and brake-drum when a strain on a line extending from the line-drum is sufficient to rotate said line-drum in pay-out direction and arranged to move the brake-band in heave-in direction when said strain subsides, a main valve for said engine having a stem rotatable between closed and open positions, an auxiliary valve by-passing said main valve, a solenoid connected to and when energized adapted to open said auxiliary valve, connections between said brake-band and valve gear lever adapted to move the lever away from heave-in position when the brake-band moves in pay-out direction, said electric brake mechanism adapted when energized to permit rotation of said engine shaft in opposite directions whereby said shaft may be rotated in pay-out direction through said gearing by pay-out rotation of said drum or said shaft may rotate said drum in heave-in direction, connections between said engine shaft and main valve stem whereby the latter is rotated in opening and closing directions accordingly as the former rotates in pay-out or heave-in directions and a reclaim switch operable by said connections, connections between said brake-band and said lever whereby the latter is moved by the former from and to heave-in positions and a pilot switch operable by said connections, and electrical circuit means for connecting said switches and said solenoid and said electric brake mechanism to a source of energy, all adapted and arranged whereby as the brake-band is moved in pay-out direction the lever is moved from heave-in position while the brake mechanism is energized by action of the pilot switch and the main valve stem is rotated in valve opening direction and when the brake-band moves in heave-in direction the lever is moved to heave-in position while the valve stem is rotated in valve closing directions and the reclaiming switch is operated so that by it and the pilot switch the brake mechanism and solenoid of the auxiliary valve are energized and said valve is held open until after the main valve is closed.

ALMON A. JOHNSON.

REFERENCES CITED

The following references are of record in the file of this patent:

UNITED STATES PATENTS

| Number | Name | Date |
|---|---|---|
| 1,020,928 | Riley | Mar. 19, 1912 |
| 1,465,808 | Christmas | Aug. 21, 1923 |
| 990,944 | Zwiker | May 2, 1911 |